US010210144B2

United States Patent
Wan et al.

(10) Patent No.: US 10,210,144 B2
(45) Date of Patent: Feb. 19, 2019

(54) CREATION AND DISPLAY OF A WEBPAGE WITH ALTERNATIVE LAYOUTS FOR DIFFERENT WEBPAGE WIDTHS

(71) Applicant: ADOBE INC., San Jose, CA (US)

(72) Inventors: Samuel Wan, Portland, OR (US); Razvan Cotlarciuc, Seattle, WA (US); David Williamson, Woodinville, WA (US); David Stephens, Shoreline, WA (US); Abhishek Gulati, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/238,636

(22) Filed: Aug. 16, 2016

(65) Prior Publication Data

US 2018/0052808 A1    Feb. 22, 2018

(51) Int. Cl.
*G06F 17/00* (2006.01)
*G06F 17/22* (2006.01)
*G06F 17/30* (2006.01)

(52) U.S. Cl.
CPC ........ *G06F 17/2247* (2013.01); *G06F 17/227* (2013.01); *G06F 17/30905* (2013.01)

(58) Field of Classification Search
CPC .. G06F 17/212; G06F 17/2247; G06F 17/227; G06F 17/30905
USPC ........................................................ 715/205
See application file for complete search history.

(56) References Cited

U.S. PATENT DOCUMENTS

| 7,516,402 | B2 * | 4/2009 | Koivisto | G06F 17/212 715/204 |
| 8,555,155 | B2 * | 10/2013 | Harrison | G06F 17/30899 709/203 |
| 8,726,150 | B2 * | 5/2014 | Sakata | G06F 17/3089 707/E17.119 |
| 9,195,637 | B2 * | 11/2015 | Peraza | G06F 17/214 |
| 9,311,422 | B2 * | 4/2016 | Rumsey | G06F 17/248 |
| 9,514,106 | B2 * | 12/2016 | Yamamoto | G06F 17/30861 |
| 9,665,617 | B1 * | 5/2017 | Long | G06F 17/30424 |
| 9,747,258 | B2 * | 8/2017 | Ben-Aharon | G06F 17/248 |

(Continued)

OTHER PUBLICATIONS

Pan et al., A Static Load-Balancing Scheme for Parallel XML Parsing on Multicore CPUs, IEEE 20007, pp. 1-10.*

(Continued)

*Primary Examiner* — Cong-Lac Huynh
(74) *Attorney, Agent, or Firm* — Brake Hughes Bellermann LLP

(57) ABSTRACT

Methods and systems for creating a webpage having different element orders for different webpage widths are disclosed. A computing device receives inputs specifying different layouts of elements in different orders for different webpage widths. The computing device creates markup code for the webpage that specifies separate subtrees of nodes for the different layouts and then modifies the markup code to replace duplicate nodes with placeholders in the subtrees. The computing device also creates script code for the webpage with instructions for modifying a live DOM created from the markup code based on current webpage width. Specifically, the script code modifies the live DOM to specify positioning the elements differently for different webpage widths by changing the visibility of nodes and swapping placehoders and content nodes in the subtrees.

18 Claims, 15 Drawing Sheets

(56) References Cited

U.S. PATENT DOCUMENTS

| | | | | |
|---|---|---|---|---|
| 9,785,332 B1* | 10/2017 | Karppanen | ............ | G06F 3/0485 |
| 9,805,003 B2* | 10/2017 | Elings | ................. | G06F 17/2229 |
| 9,817,804 B2* | 11/2017 | Goldstein | ............ | G06F 17/2288 |
| 9,886,519 B2* | 2/2018 | Liang | ...................... | G06F 17/25 |
| 2008/0021916 A1* | 1/2008 | Schnelle | ............ | G06F 17/30917 |
| 2013/0033523 A1* | 2/2013 | Stovicek | ............ | G06F 17/30905 |
| | | | | 345/649 |

OTHER PUBLICATIONS

Chen et al., Detecting Web Page Structure for Adaptive Viewing on Small Form Factor Devices, ACCM 2003, pp. 225-232.*

Chen et al, Adapting Web Pages for Small-Screen Devices, IEEE 2005, pp. 50-56.*

Jacobs et al., Adaptive Document Layout, Google Scholar 2004, pp. 60-66.*

Gupta et al., Mobile Web: Web Manipulation for Small Displays using Multi-level Hierarchy Page Segmentation, ACM 2007, pp. 599-606. (Year: 2007).*

* cited by examiner

Create layout for large breakpoint interval

Modify to create layout for small breakpoint interval

Test Large breakpoint interval layout after change to small breakpoint interval layout

CREATION AND DISPLAY OF A WEBPAGE WITH ALTERNATIVE LAYOUTS FOR DIFFERENT WEBPAGE WIDTHS

TECHNICAL FIELD

This disclosure relates generally to computer-implemented methods and systems and more particularly relates to improving the efficiency and effectiveness of computing methods and systems used to create and display webpages.

BACKGROUND

A webpage displays text, images, and other elements based on markup code such as hyper-text markup language (HTML) code. To render a webpage, most web browsers download the webpage's markup code document (e.g., the HTML code) and any associated web resources (e.g., JavaScript, CSS, images, etc.) into local memory. The web browser parses the markup code document to create an internal model that is similar to the document object model (DOM) tree structure. This internal model (i.e., the "live DOM") represents a hierarchical tree of nodes that identify displayed elements and attributes. The web browser displays the elements by applying layout rules that are highly dependent upon the order of the live DOM hierarchy. The laying out of elements being limited by the order of the live DOM hierarchy significantly limits the creation of webpages that use alternative/variable layouts, such as responsive webpages that respond to browser screen size (e.g., current webpage width).

Existing webpage design tools allow designers to design responsive webpages. For example, FIG. 1A illustrates a portion of a design interface 1 that allows a designer to position elements on a design canvas 2. In this example, the designer has positioned a red box 3, a green box 4, and a blue box 5. Based on these positions, the design tool generates webpage code that specifies the display of the boxes 3, 4, 5 in a created webpage. The design interface 1 allows the designer to preview the responsive design of the webpage by changing the width of the canvas area 2 from width 6 to another width. As shown in FIG. 1B, when width 6 (FIG. 1A) is reduced to width 7, the webpage responds by reducing the respective widths and changing the positions of the red box 3, the green box 4, and the blue box 5.

Existing webpage design tools are limited with respect to allowing designers to create and customize responsive designs. Specifically, a designer is able to customize some aspects of the elements for particular screen sizes, but cannot make any alterations that would require different screen sizes using different element orders or hierarchy organizations. This limitation is illustrated in FIGS. 2A-C. In FIG. 2A a designer has created a layout by positioning boxes 3, 4, 5 on the canvas 2. The design tool generates HTML code 8 specifying these elements. The designer intends to use the original layout of FIG. 2A as a desktop layout and the variation shown in FIG. 2B as a mobile layout for smaller webpage widths (e.g., widths of 454 and fewer pixels). After creating the FIG. 2A layout, the designer initiates a new layout and, for the mobile layout, repositions the boxes 3, 4, 5 vertically stacked: blue box 5 then red box 3 then green box 4 from top to bottom, as shown in FIG. 2B. However, because this changes the order of the boxes 3, 4, 5, it requires altered HTML code 9 and will result in corresponding altered live DOM structure changes. The designer intended to change only the appearance of the mobile layout, but the change to the HTML and corresponding live DOM structure has unintended consequences on the other layouts. Specifically, as shown in FIG. 2C, after changing the mobile layout, when the designer tests the desktop layout, its appearance is based on the modified HTML 9 and the appearance of the boxes 3, 4, 5 differs substantially from the intended appearance of FIG. 2A. Similarly, a designer cannot make any alterations that would require different screen sizes using different hierarchy organizations. For example, in some cases, elements are located under different parents across multiple breakpoints, such as being contained inside another user interface element, for one breakpoint, and directly on the page for another breakpoint.

Existing webpage design tools are limited to creating multiple designs for a webpage that all use a single order of elements in the HTML's DOM. Since webpage layout rules prevent the same element from appearing under different parent nodes for different designs, existing tools avoided using alternative orders of elements that would have thus required duplicating nodes for the common elements and other portions of the designs. Such duplication would have, for example, increased the webpage size, transmission time, and storage requirements, introduced complexity and the risk of inconsistency in the webpage, and had a negative impact on search engine use of the webpage. Thus, when creating a webpage with multiple layouts for different webpage widths using existing webpage design tools, a designer is not able to design independent alternative layouts that would reorder the elements. Moreover, there is no way to address this issue by modifying the live DOM hierarchy using cascading style sheets (CSS) media queries. Thus, even armed with a sophisticated knowledge of CSS and HTML, webpage designers are unable create a single webpage with alternative layouts with different element orders for the different webpage widths of differing devices. This means that designers must sacrifice design freedom for the sake of multi-device support or sacrifice multi-device support to have design freedom.

SUMMARY

Methods and systems for creating a webpage having different element orders for different webpage widths are disclosed. In one exemplary embodiment, a computing device receives a first input specifying a first layout of elements in a first order for a first webpage width and a second input specifying a second layout of the elements in a second order for a second webpage width. The first webpage width is different from the second webpage width and the first order is different from the second order. The computing device creates markup code for the webpage that specifies separate subtrees of nodes for the first layout and the second layout and then modifies the markup code to replace duplicate nodes with placeholders in the subtrees. The computing device also creates script code for the webpage with instructions for modifying a live DOM created from the markup code based on current webpage width. Specifically, the script code modifies the live DOM to specify positioning the elements in the first order when the current webpage width is the first webpage width and to specify positioning the elements in the second order when the current webpage width is the second webpage width. The script code also modifies the live DOM so that any placeholders in the subtree for the current webpage width are replaced with actual content nodes.

These illustrative features are mentioned not to limit or define the disclosure, but to introduce exemplary features to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Introduction

Figure 1A:
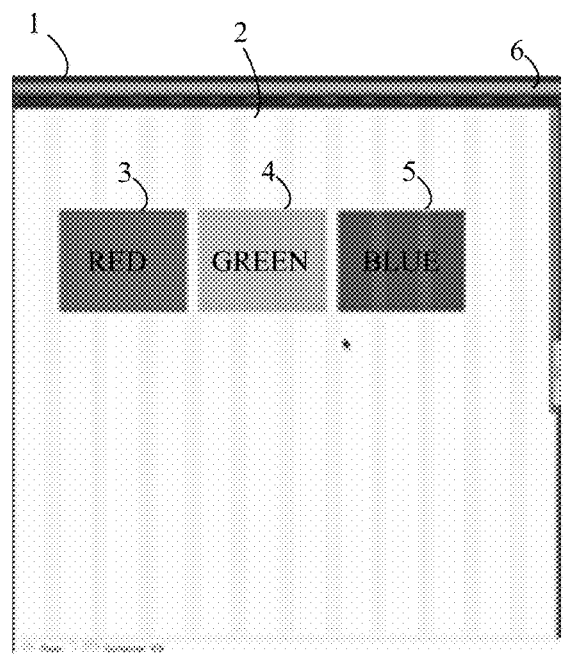
FIG. 1A illustrates a design tool providing a design interface that allows a designer to create a responsive webpage.
Figure 1B:
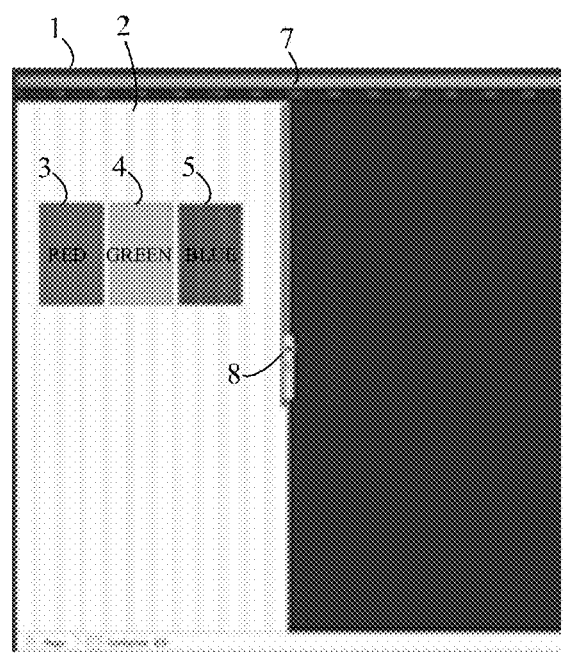
FIG. 1B illustrates a webpage in the design tool of FIG. 1A responding to a width change.
Figure 2A:
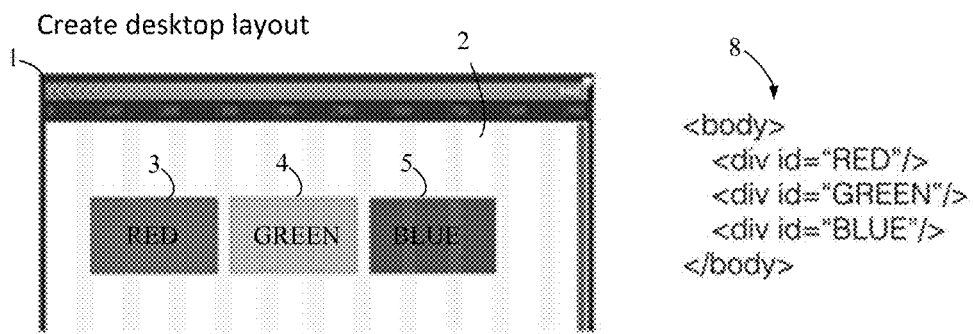
FIG. 2A illustrates creation of a desired desktop layout using a design tool.
Figure 2B:
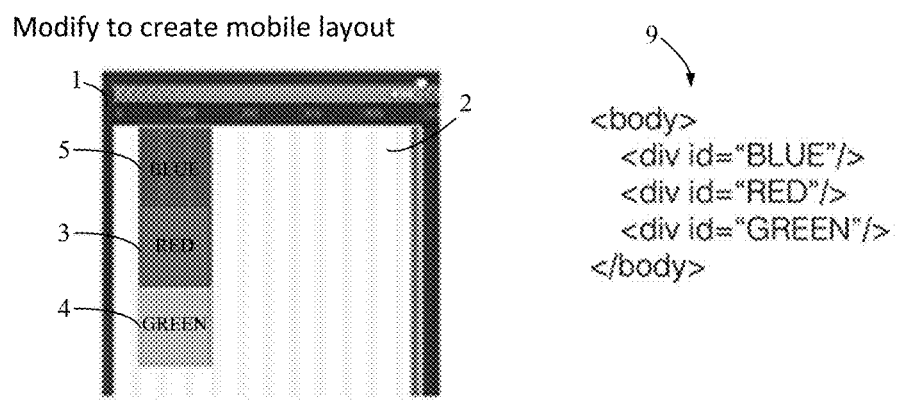
FIG. 2B illustrates creation of a desired mobile layout using the design tool.
Figure 2C:
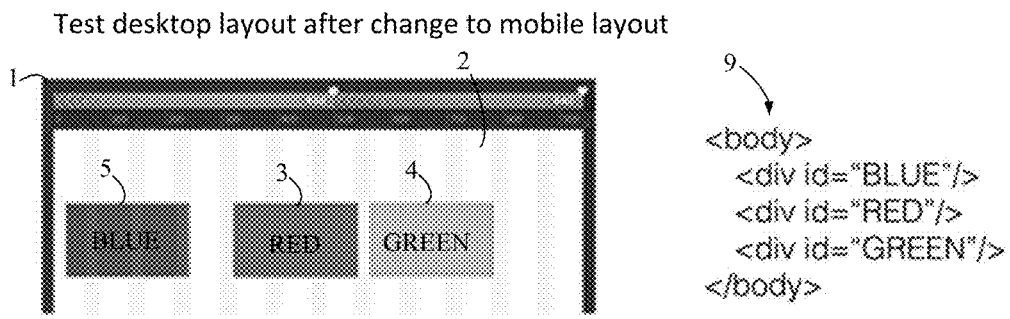
FIG. 2C illustrates that previewing the desktop layout after creating the mobile layout reveals that creating the mobile layout undesirably altered the desktop layout.

As discussed above, existing webpage design tools are limited to creating multiple designs that all use a single order of elements for a webpage. Embodiments of the invention facilitate the creation of a webpage with different subpage layouts that include elements in differing orders, while avoiding duplication of elements in nodes in markup code, such as HTML, that specifies the structure of the webpage. The designer is unrestrained in designing different subpage layouts for different webpage widths. For example, the designer creates a first subpage layout for when the webpage width is from 0-100 pixels, a second subpage layout for when the webpage width is 101-200 pixels, etc. A webpage design tool allows the designer to create these multiple subpage layouts with elements that are reused in different, unrestricted positions and orders. Based on the layouts for the subpages, the webpage design tool creates markup code that defines a DOM structure with different subtrees for each of the different layouts. The webpage design tool changes the markup code to replace duplicates of element nodes with placeholders. The webpage design tool also creates script code that will adjust the live DOM of the webpage based on the current webpage width to make the appropriate subtree of nodes visible and change that subtree's placeholders to content nodes. The webpage tool is thus able to produce the markup code and script code for a responsive webpage based on unrestricted designer designs for multiple subpages for different webpage widths.

The invention provides new techniques for a webpage design tool to produce a webpage based on unrestricted designer layouts for multiple webpage subpages. For example, a designer creates layouts for a web page for two webpage width ranges: a range of width expected to correspond to mobile phone devices and a range of widths expected to correspond to desktop devices. Each of these subpages can be viewed as a standalone page. Each subpage has real content (e.g., displayed text, graphics, etc.), and helper content that may or may not be seen by the end user (e.g., different DIV nodes that help group elements together, an accordion which is visible only in the design for mobile phone device). After the designer creates the two layouts, the webpage design tool generates the markup code that defines the subpage layouts in a DOM structure that has subtrees that have duplicate elements. The webpage design tool removes this duplication by replacing duplicate nodes with placeholders. One exemplary process for removing the duplication starts with a leaf node and searches for the leaf node in other subtrees. If the same leaf node is found in other subtrees, the leaf node in the first subtree is considered the "shared node" and the same leaf node found in the other subtrees are replaced with placeholder nodes that identify the shared node rather than duplicating its content. This process is repeated for all leaf nodes of the tree. The process is then performed for the parents of the leaf nodes as long as the sub-trees of the parents are identical, and for the parents of the parents, etc., until the duplicate nodes in the subtrees have been replaced with placeholder nodes. Ultimately, the design tool produces markup code that defines the subpage layouts in a DOM structure with minimal or no duplication.

The webpage design tool also creates script code for detecting current webpage width and adjusting the live DOM of the webpage based on the current webpage width to display the appropriate layout for the current webpage width. The script makes the appropriate subtree of nodes visible and changes that subtree's placeholders to content nodes. More specifically, the script code is configured to detect a current webpage width (e.g., 50 pixels wide) and, based on this, change a first subtree of nodes (e.g., nodes for webpage widths 0-100) to visible, change all the other subtrees of nodes (e.g., nodes for other webpage width ranges) to invisible, identify placeholder nodes in the first subtree, identify corresponding shared nodes in other subtrees for the placeholder nodes, and swap the placeholder and shared nodes. In this way, a responsive webpage design is produced that can render unrestricted layouts, using the webpage elements in any desired order, in rendering browsers that layout elements based on the order of the elements in markup code-specified DOM structures.

At runtime (when the webpage is used by an end user), the markup code of the webpage is used to create a live DOM when the webpage is viewed by an end user using a web browser. Even though the markup code specifies multiple nodes with different orders of the elements, when the webpage is initiated at (or resized to) a particular width, only one of the subtrees of nodes is visible, the one that corresponds to the appropriate order of elements for the current webpage width. This is achieved by using script code of the webpage to detect the current webpage width and alter the live DOM to make the subtree of nodes specifying the appropriate order of elements visible and the other subtrees invisible. Page-width specific styles can also be used, for example, by accessing specific cascading style sheet (CSS) information for individual layouts using CSS Media Queries.

The following example illustrates the use of webpage script code to alter a webpage's live DOM to provide alternative layouts having different element orders for different webpage widths. In this example, the markup code of the webpage specifies a first subtree of nodes for a first layout of elements in a first order (e.g., A, B, C, D) and a second subtree of nodes for a second layout of elements in a second order (e.g., B, C, A, E). The webpage designer intends the first layout to be used for a breakpoint interval of webpage widths of 501 or more pixels wide (i.e., the infinite breakpoint interval) and that the second layout be used for a second breakpoint interval of 500 and fewer pixels wide (i.e., the 500 breakpoint interval). In this example, the markup code specifies a default condition making the first subtree of nodes visible and the second subtree of nodes invisible. When the webpage is rendered by a browser, the markup code is interpreted by the browser to create a live DOM, the live DOM is altered by script code in specified circumstances, and the page is rendered using the live DOM. For example, when the webpage is initially loaded in a web browser and the page width is 700 pixels, the markup code is used to create a live DOM, the script code determines that the current page width (i.e., 700 pixels) requires no change to the live DOM, and the webpage is rendered using with the first layout of the elements (i.e., the first subtree of nodes is visible and the second subtree of nodes is invisible). When the end user resizes the web browser window to decrease the page width to 400 pixels, the script code detects the page width change, determines that the current page width (i.e., 400 pixels) requires a change to the live DOM, and changes the live DOM to make the first subtree of nodes invisible and the second subtree of nodes visible. The webpage is then rendered using with the second layout of the elements (i.e., the second subtree of nodes is visible and the first subtree of nodes is invisible). In another example, the webpage is initially loaded in a web browser and the page width is 400 pixels, the markup code is used to create a live DOM, the script code determines that the current page width (i.e., 400 pixels) requires a change to the live DOM and adjusts the live DOM, and the webpage is rendered using with the second layout of the elements (i.e., the second subtree of nodes is visible and the first subtree of nodes is invisible).

At runtime, the script code of the webpage also adjusts the placeholders and shared nodes of the live DOM. For example, if a text item is used in both a first layout and a second layout, the text item is specified by a content sub-node within the first breakpoint root node and a placeholder within the second breakpoint root node. However, when the script code adjusts the live DOM to change the order of elements, for example, by changing node visibilities, the script code also changes the live DOM to swap the content-sub node and its associated placeholder. For example, if the script code changes the live DOM of the webpage so that the first breakpoint root node is not visible and the second breakpoint root node is visible, the script code further puts the content sub-node into the second breakpoint root node where the placeholder was before and puts the placeholder into the first breakpoint root node where the content sub-node was before. Note that for any given page element, there can be generally only one content node associated with that element and maximum n−1 placeholders linked to it (where n is the total number of breakpoints).

Creating and rendering a single webpage with alternative layouts for differing current page widths using the various technique of various embodiments of the invention provides numerous benefits. The techniques generally avoid the need to multiple individual webpages for the different size versions of a webpage. This improves search engine optimization and reduces the time, expenses, and errors that result from having to maintain multiple version of webpages for similar content. The techniques also allow unrestricted design of different subpages for different screen size that avoid duplication. Specifically, using placeholder nodes reduces or eliminates duplication of content nodes in the markup code and the corresponding live DOM structures, which reduces file size, preserves bandwidth, improves rendering speed, optimizes search engine use, and makes content management and editing easier. In addition, using the same element instead of duplicate elements across different layouts for different webpage widths allows the state of interactive content and widgets to be maintained when webpage widths changes. Consider an example in which a slideshow element is available for both desktop and tablet webpage widths. If an end user views a webpage with the slideshow at the desktop width, scrolls halfway through the slideshow, and then reduces the size of the web browser window to tablet width, the webpage can be refreshed to show the tablet layout including the slideshow element without losing the scroll. In contrast, if two distinct copies of the slideshow had been used for the different layouts, the user's scroll halfway through the slide show would have been lost.

The techniques of embodiments of the invention are beneficial to designer as well. Designers are able to use a visual design tool that to graphically create a single webpage with multiple, unrestricted layouts that can use differing element orders while remaining 100% faithful to the intent of the webpage designer. The design tool enables truly free-form responsive design. This means that the designer can create completely different layouts for different screen sizes using a visual design tool, using the common elements across all of the layout variations in different orders and combinations. The designer can position, size, and reorder content elements in these layouts without any consideration of the webpage code that will automatically be generated, and without any consideration of how web browser layout engines work or limitations imposed by web browser rendering processes. The visual design tool gives the designer complete freedom to graphically create unrestricted, original layouts for different widths of a single webpage. Moreover, elements that are common to multiple layouts need only be edited in one place so that the designer is not burdened with having to separately create and maintain multiple instances of an element that is the same in multiple layouts. The designer is able to design a webpage using the same and different elements independently for multiple page widths without any constraints.

Terminology

As used herein, the phrase "webpage" refers to content that is displayable by a web browser based on a document, usually written in hyper-text-markup-language (HTML) or comparable markup code, and web resource elements, such as style sheets, script code, and/or images. HTML and other markup code specifies the elements of the webpage using a hierarchical structure that is interpreted by a web browser.

The phrases "live Document Object Model" and "live DOM" refer to a hierarchical model of webpage content created by a web browser parsing a webpage's markup code document. To render a webpage, most web browsers download the markup code document and web resources into local memory, parse the markup code document, and use an internal model that is similar to the document object model (DOM) tree structure. This internal model is an example of a "live DOM." Generally, markup code of a webpage specifies a DOM structure and web browsers interpret that markup code to create the live DOM.

As used herein, the phrase "script code" refers to any interpreted programming language code, including but not limited to, JavaScript, that is separate from the markup code used to create a webpage. Script code, in one example, is used to modify the live DOM of webpage that is created by a browser when rendering the webpage.

As used herein, the phrase "markup code" refers to any declarations or other code written in a markup language such as hyper-text-markup-language (HTML).

As used herein, the phrase "element" refers to any container, text, image, video, or other feature of a webpage that displays content or that is used to display content. The appearance of elements of a webpage is specified by the webpage's markup code, script code, and associated style sheets. An element of a webpage can be nested within another element of the webpage. For example, a text element and an image element can be nested within a container element.

As used herein, the phrase "placeholder" refers to any node that identifies another node as a source of the node's content rather than containing the actual content. For example, a shared node can define text used as a title in a webpage and a placeholder node used for the same content identifies the shared node rather than separately defining the text. A placeholder node can identify shared node using any appropriate pointing, identification, or referencing technique. For example, a placeholder node can identify the shared node by using a common identifier as the shared node, by identifying the node of the shared node using node specific information such as a node identifier, etc.

As used herein, the phrase "webpage width" refers to a horizontal amount of a webpage that is displayed. The webpage width can depend upon the device display size and/or on the sizing of the web browser window. In one example, webpage width is a quantity measured in pixels, inches, or any other appropriate unit of measure. In another example, webpage width is identified based on web browser property information. In another example, device display width is used as webpage width. In another example, webpage width is a width classification, for example, based on device type. Example webpage width classes include, but are not limited to, mobile device width, tablet device width, desktop device width, etc. In these examples, webpage width is a classification determined simply by determining device type.

As used herein, the phrases "webpage width interval" and "breakpoint interval" refer to a range of webpage width values. Non-limiting examples include an interval from 0 to 499 pixels and an interval from 500 to infinite pixels. A breakpoint is a width at which webpage layout differences are specified, i.e., the layouts are different on each side of the breakpoint. For example, a designer can identify 299 and 499 as breakpoints and define a first layout for the infinite breakpoint interval (500+ pixel widths), a second, different layout for the 499 breakpoint interval (300 to 499 pixel widths), and a third, different layout for the 299 breakpoint interval (0 to 299 pixel widths). In this example, a breakpoint is identified by the designer and used as the max value of a breakpoint interval and the min value of the breakpoint interval is inferred from the next smallest, specified breakpoint.

As used herein, the phrase "visibility" refers to a property of an element that determines whether the element and its sub-elements are displayed. In the context of a live DOM, the visibility of a node determines whether the associated elements of the node and sub-nodes will be displayed. In one example, visibility of an element is determined based on whether the element is "active" or "not active" in a live DOM.

Examples of a Webpage with Alternative Layouts for Different Webpage Widths

Figure 3A:
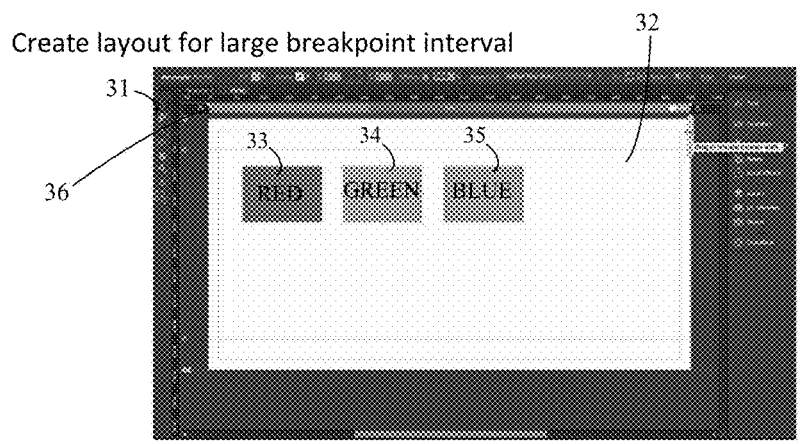
FIG. 3A illustrates creation of a desired desktop layout using a design tool that is able to create desired layouts for different webpage widths.
Figure 3B:
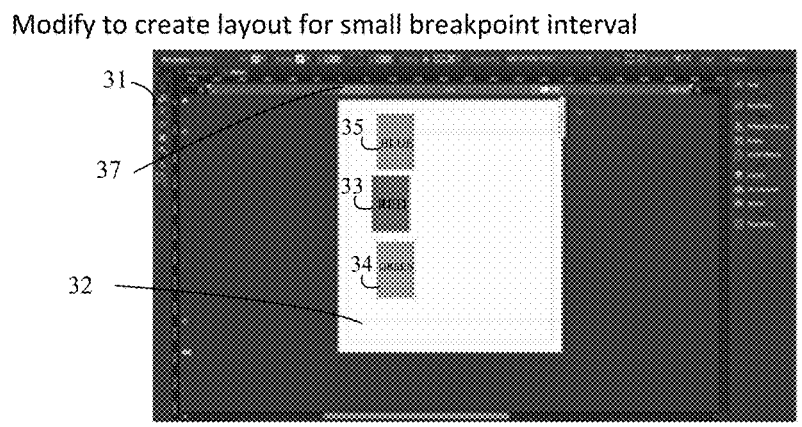
FIG. 3B illustrates creation of a desired mobile layout using the design tool.
Figure 3C:
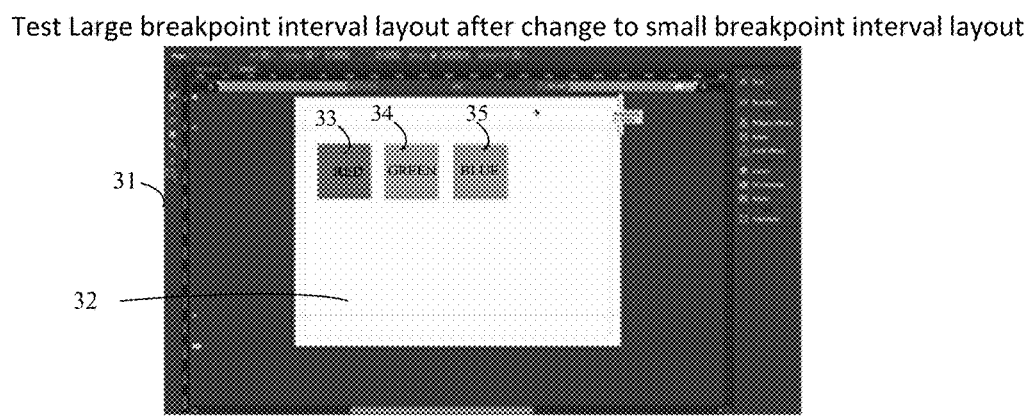
FIG. 3C illustrates that previewing the desktop layout after creating the mobile layout reveals that creating the mobile layout did not undesirably alter the desktop layout.

FIGS. 3A-C illustrate a design tool interface 31 that is able to create desired layouts for different webpage widths. In FIG. 3A, the designer creates a layout for a large breakpoint interval 36 by positioning a red element 33, a green element 34, and a blue element 35 from left to right respectively on the design canvas 32. In FIG. 3B, the designer modifies the order of the elements 33, 34, 35 to create a different layout for a small breakpoint interval 37. After having made the changes to specify the small breakpoint interval layout, the designer tests the large breakpoint interval layout, as shown in FIG. 3C, by resizing the design canvas 32 to a width within the large breakpoint interval. In this way the designer is able to easily create the alternative layouts with different element orders for the webpage and confirm that the different layouts switch from one to the other without undesirable/unintended changes.

Examples of Creating Markup Code Defining Subtrees for Different Layouts

Embodiments of the invention create webpage layouts that include elements in differing orders, while avoiding duplication of elements in nodes in the HTML or other markup code that specifies the structure of the webpage. For example, based on the layouts for the subpages created by a designer, the webpage design tool creates HTML that defines a DOM structure with different subtrees for each of the different layouts.

Figure 4:
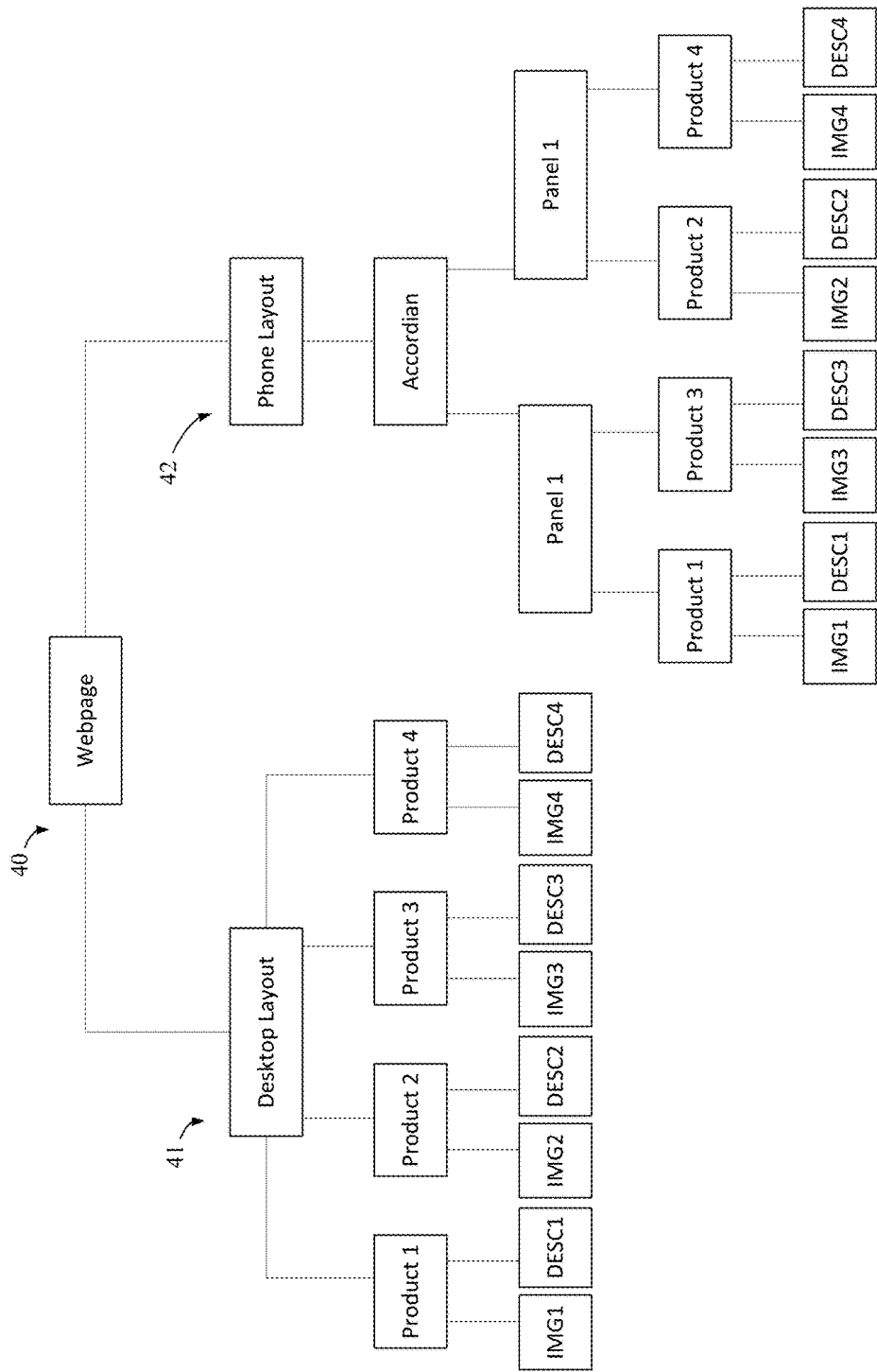
FIG. 4 illustrates an example of a DOM structure specified by HTML based on layouts created by a designer.

FIG. 4 illustrates an example of a DOM structure 40 specified by HTML based on layouts created by a designer. In this example, the designer has created a first layout for desktop devices and uses image and description elements for four products in the layout in a particular order. The desktop layout subtree 41 illustrates the order of the elements of the first layout. The designer has also created a second layout for a phone devices and uses the same images and descriptions for the four products, as well as additional accordion and panel elements. The phone layout subtree 42 illustrates how its ordering and combination of elements differ from those of the desktop layout subtree 41.

Figure 5:
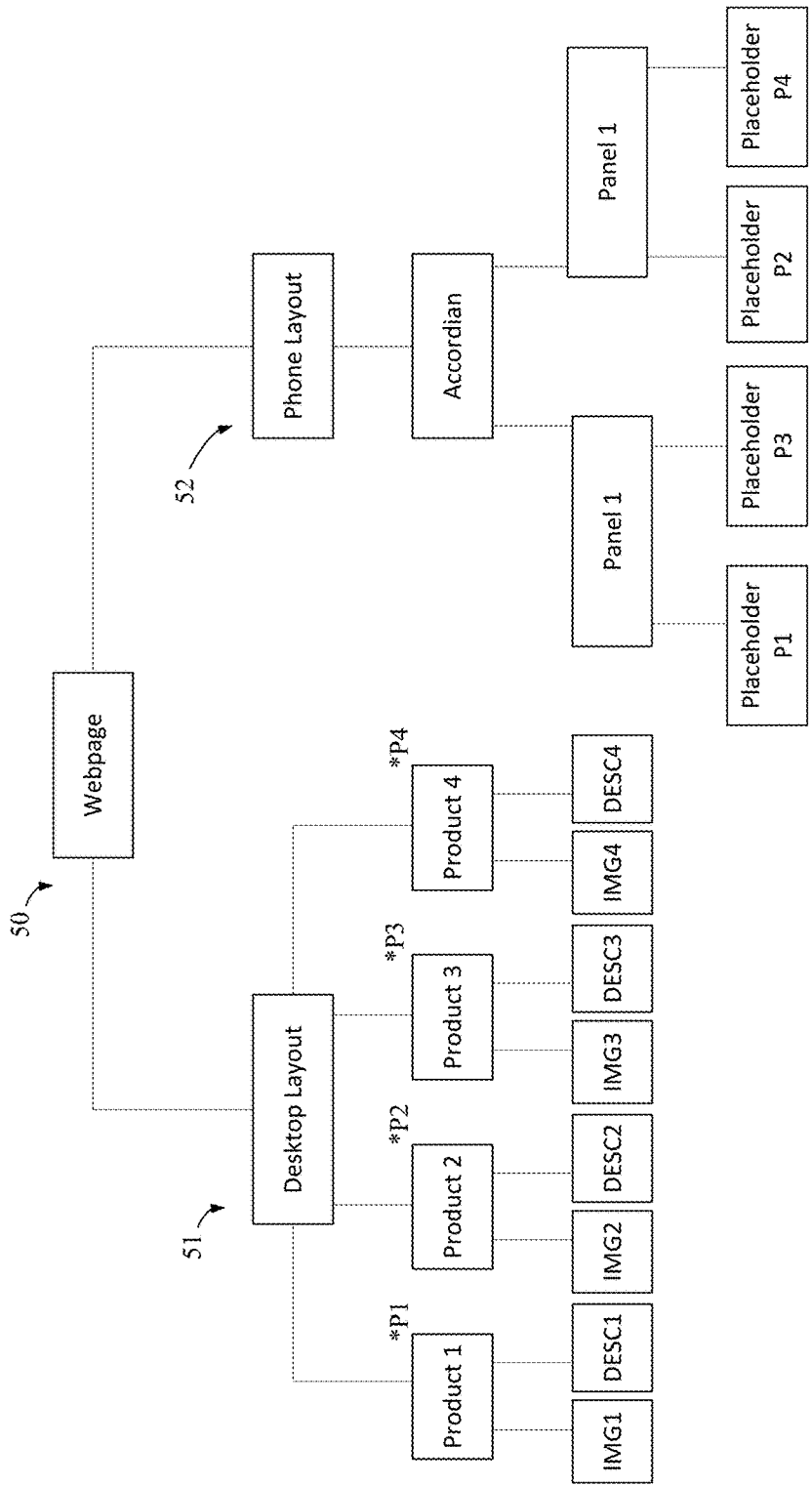
FIG. 5 illustrates the DOM structure of FIG. 4 after a webpage design tool changes the HTML to replace duplicates of element nodes with placeholders.

FIG. 5 illustrates the DOM structure 50 of FIG. 4 after a webpage design tool changes the HTML to replace duplicates of element nodes with placeholders. In this example, the product parent nodes for each of the four products, Product 1, Product 2, Product 3, and Product 4, in the desktop layout 51 are identified as shared nodes that are also used in the phone layout. The four product parent nodes for Product 1, Product 2, Product 3, and Product 4 in the phone layout subtree 52 are each replaced with a respective placeholder pointing to the corresponding shared node in the desktop layout subtree 51. Placeholder P1 in the phone layout subtree 52 points to the Product 1 node in the desktop layout subtree 51, Placeholder P2 points to Product 2 node, Placeholder P3 points to Product 3 node, and Placeholder P4 points to Product 4 node. By pointing to the Product 1, which is a parent node, Placehoder P1 effectively points to the Product 1 node and its two subnodes for IMG1 and DESC1, Placehoder P2 effectively points to the Product 2 node and its two subnodes for IMG2 and DESC2, Placehoder P3 effectively points to the Product 3 node and its two subnodes for IMG3 and DESC3, and Placeholder P4 effectively points to the Product 1 node and its two subnodes for IMG1 and DESC1. Thus, each place holder, P1, P2, P3, P4, is able to effectively replace four nodes that were previously in the phone layout subtree 42 of FIG. 4.

Examples of a Using Script Code to Alter Webpage Element Order

Figure 6:
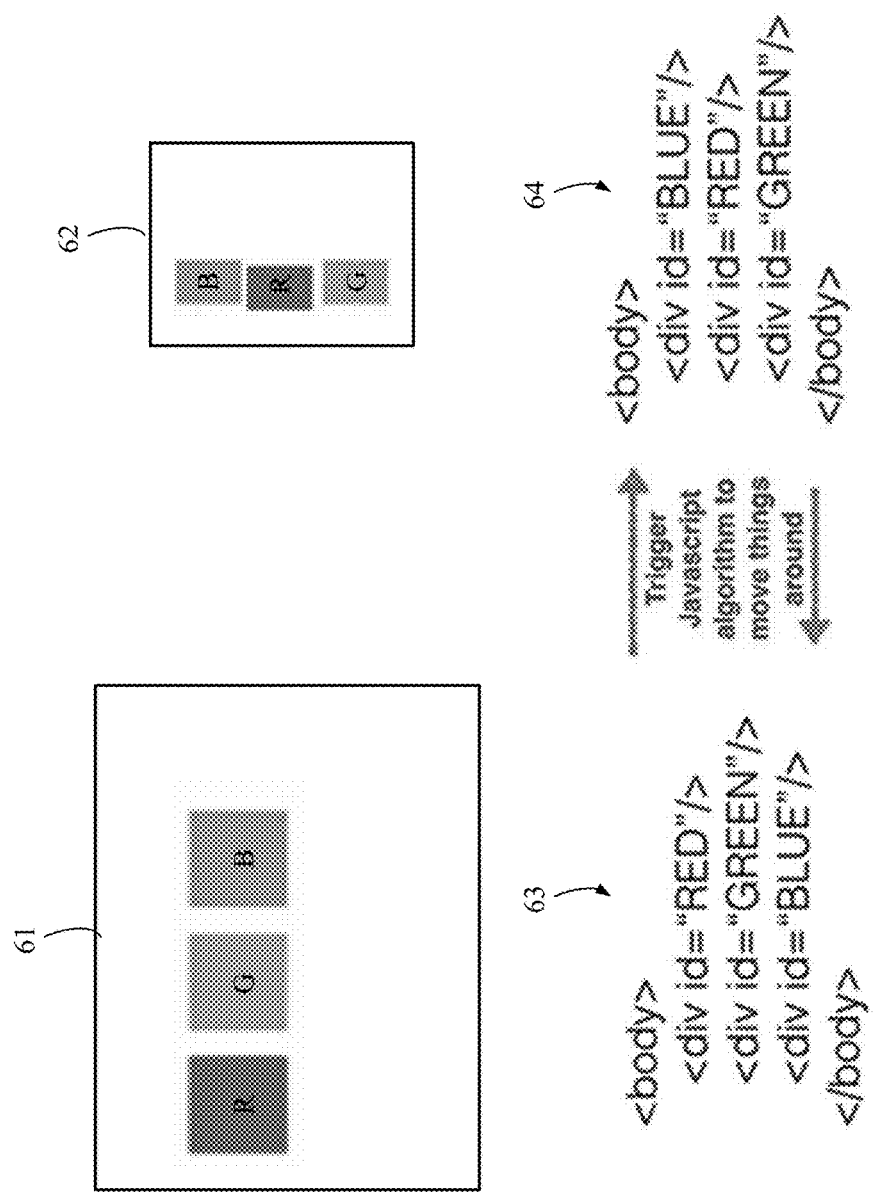
FIG. 6 illustrates providing different element orders in different layouts of a webpage for different webpage widths using script code to alter the markup code of the webpage.

FIG. 6 illustrates providing different element orders in different layouts 61, 62 of a webpage for different webpage widths using script code to alter the markup code of the webpage. In this example, the markup code 63 of the first layout 61 includes an order of elements from red to green to blue. When the webpage is initialized or resized to the smaller webpage width, however, the markup code 63 is altered to altered markup code 64 and includes an order of elements from blue to red to green. The web browser uses the altered markup language to provide the smaller layout 62.

Figure 7:
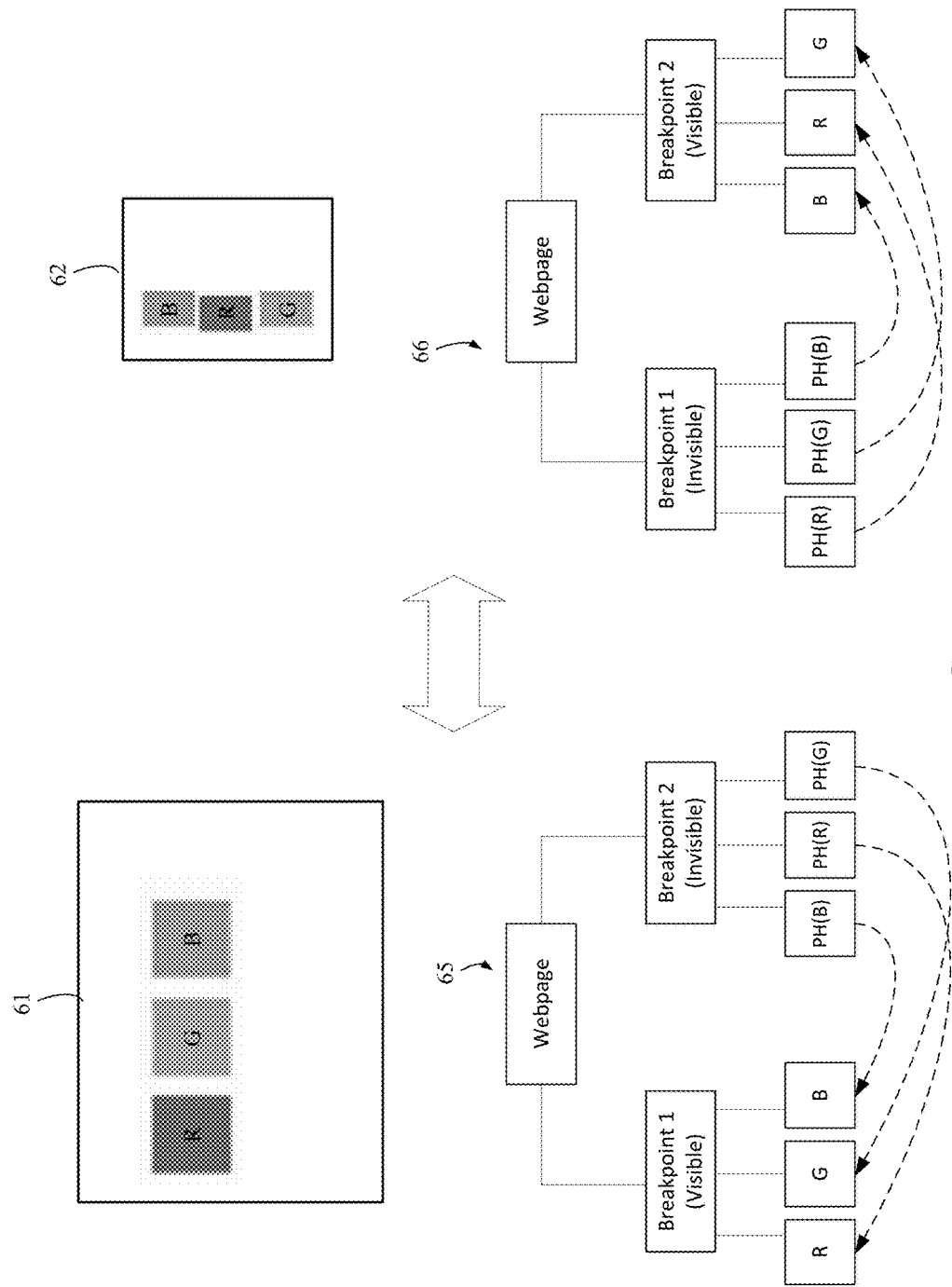
FIG. 7 illustrates providing different element orders in different layouts of a webpage for different webpage widths using script code to alter the visibility and the place in the hierarchy of nodes in a live DOM of the webpage.

FIG. 7 illustrates providing different element orders in different layouts 61, 62 of a webpage for different webpage widths using script code to alter the visibility of nodes in a live DOM of the webpage. In this example, the live DOM 65 includes a hierarchy of elements, including a visible breakpoint 1 node with an R, G, B order and an invisible breakpoint 2 node with ordered placeholders PH(B) for B, PH(R) for R, and PH(G) for G. When the webpage is initialized or resized to the smaller webpage width, however, script code alters the webpage DOM 65 to webpage DOM 66. Specifically, the breakpoint 1 node is changed to invisible and the breakpoint 2 node is changed to visible. In one example, the visibility of nodes is controlled by making a node active to make it visible or inactive to make it invisible.

In addition, the content nodes and placeholder nodes are swapped, as shown in FIG. 7. In the breakpoint 2 sub-nodes, the placeholder PH(B) is replaced with content B, the placeholder PH(R) is replaced with content R, and the placeholder PH(G) is replaced with content G. In the breakpoint 1 sub-nodes, the content R is replaced with a placeholder PH(R) for content R, the content G is replaced with a placeholder PH(G) for content G, and the content B is replaced with a placeholder PH(B) for content B. The web browser uses the altered live DOM to provide the smaller layout 62.

Examples of Systems for Creating and Using Webpages with Alternative Layouts

Figure 8:
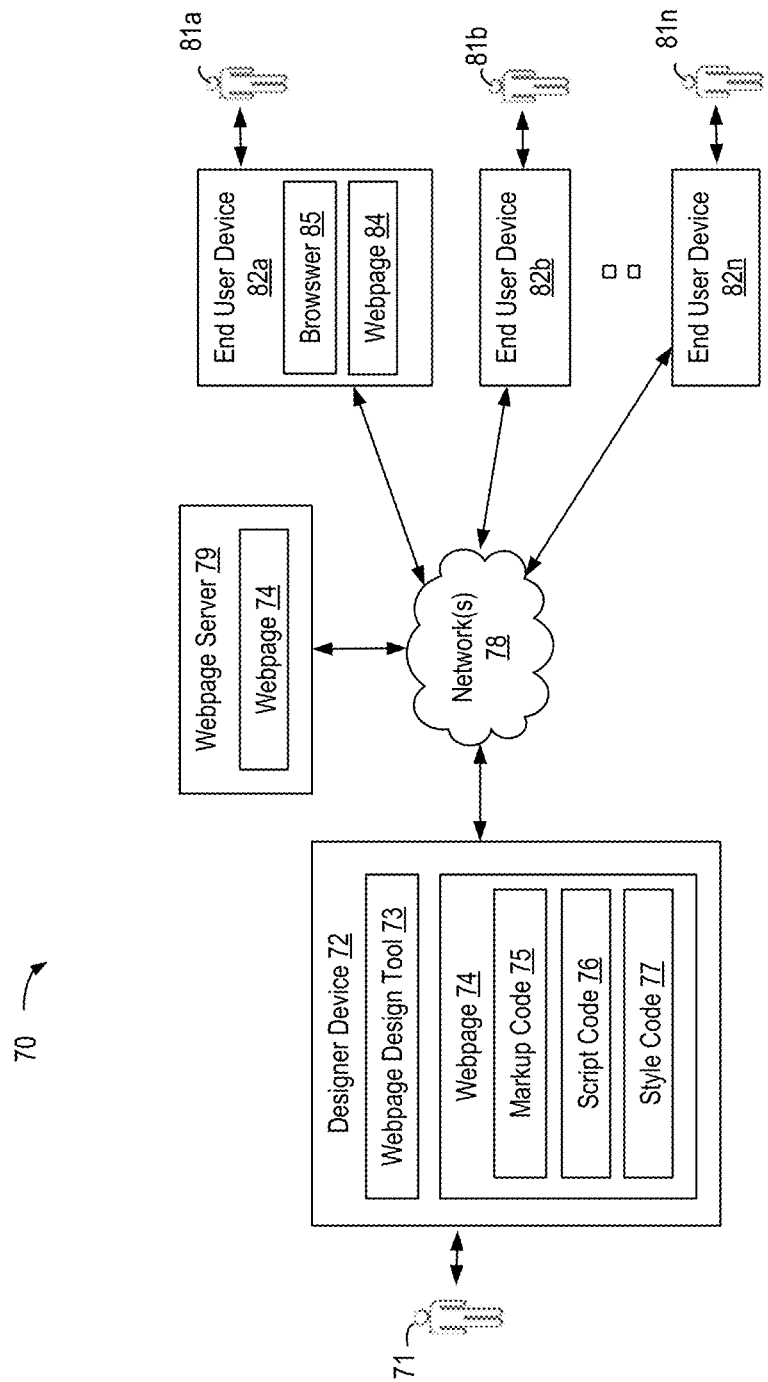
FIG. 8 is a system figure illustrating an exemplary computing environment for creating and using webpages that include alternative layouts with different element orders for different webpage widths.

FIG. 8 is a system figure illustrating an exemplary computing environment 70 for creating and using webpages that include alternative layouts with different element orders for different webpage widths. In this example, a designer 71 uses a designer device 72 to create, edit, and publish webpages. The designer device 72 includes a webpage design tool 73 that is a software application residing in memory on the designer device and executed by a processor of the designer device 72. In an alternative embodiment, the webpage design tool is provided via a remote server or other device, for example, as a cloud-based service.

The designer 71 uses the webpage design tool 73 to create, edit, and publish webpage 74, which includes markup code 75, script code 76, and style code 77. The designer exports and publishes the webpage 74 by uploading the webpage 74 to a webpage server 79, where the webpage 74 can be accessed by end users 81*a-n* using end user devices 82*a-n*. For example, end user 81*a* uses a web browser 85 on end user device 82*a* to download and view the webpage 84.

The webpage design tool 73 allows the designer to graphically create different layouts for the webpage 74. In one example, the webpage design tool 73 provides a user interface such as the user interface of FIGS. 3A-C that allows the designer to create a first layout by graphically positioning elements on a canvas, select an alternative page width (for example by selecting a create new breakpoint interval layout user interface option), and then graphically move the elements to new positions, in whatever order the designer desires, for the alternative page width layout. Based on the layouts the designer creates, code for the webpage 74 is automatically generated by the webpage design tool 73. The code for the webpage 74 includes markup code 75 that specifies the elements that are in each of the layouts. The markup code 75 references the script code 76 and style code 77. When the webpage 74 is rendered by an end user device 82*a*, the web browser 85 interprets the markup code 75 to generate a live DOM and executes the script code to detect the current webpage width and alter the live DOM appropriately. The script code 76 is executed to change the structure of the live DOM hierarchy, for example, by changing the visibility of webpage elements. Even though the structure and order of the live DOM is changed, some or all of the elements can be the same.

The style code 77 (e.g., CSS) is referenced to provide appearance attributes of the webpage elements, for example, providing different styles to elements in different layouts.

The webpage design tool 73 generates the markup code 75 of the webpage 74, in one embodiment of the invention, by first creating code that includes duplicates and then replaces duplicates with placeholders. For example, markup code 55 that specifies multiple breakpoint nodes, including a breakpoint node with sub-nodes for each breakpoint interval, is initially created. In this example, the widest breakpoint interval (e.g., the infinity interval) is selected to include content elements for all of its elements. Duplicate elements are removed from the other breakpoint nodes and replaced with placeholders pointing to a single instance of the node (i.e., a shared node).

The webpage design tool 73 generates script code 76 to perform various functions. In one embodiment, the webpage design tool analyzes the created markup code 75 to identify breakpoint nodes and uses information about the breakpoint nodes to create script code 76. Specifically, the webpage design tool 73 determines the max and min widths for the breakpoint intervals associated with each of the breakpoint nodes defined by the markup code 75. The script code 76 is created to take appropriate action by detecting the current webpage width and determining whether the current webpage width is within one of the breakpoint intervals associated with a breakpoint node defined by the markup code. Based on which breakpoint node the current width is associated, the script code 76 is configured to alter the live DOM accordingly, e.g., by changing the visibility of that breakpoint node to visible, swapping any placeholders in that breakpoint node with element content, etc. In other words, given any current webpage width, the script code is configured to ensure that the live DOM has the appropriate layout node visible and appropriately populated with content elements.

In one embodiment of the invention, both the script code 76 and the style code 77 provide layout-specific features. For example, the script code 76 can provide breakpoint specific layout and ordering of elements and the style code 77 (e.g., CSS) can provide specific element configuration, sizes, colors, appearance features, and formatting. In one embodiment of the invention, when a breakpoint node is visible (e.g., active), a CSS media query is activated so that only dimensions and other values associated with the breakpoint node are evaluated. Dimensions and other values defined in the media queries of other invisible (i.e., inactive) breakpoints will not be evaluated by the web browser 85 and are ignored. In this way, style code can be used to customize element size, color, and other attributes for different layouts of the webpage 74.

Examples of Techniques for Creating and Using Webpages with Alternative Layouts

Figure 9:
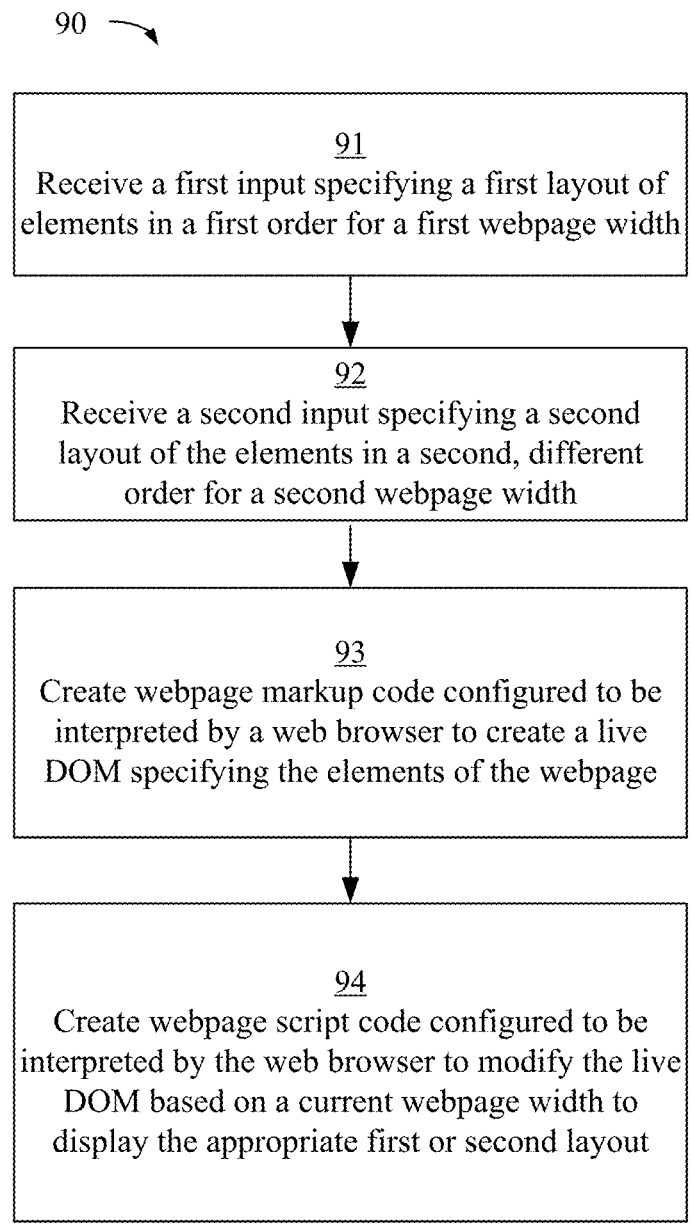
FIG. 9 is a flow chart illustrating an exemplary method for a computing device to create a webpage having different element orders for different webpage widths.

FIG. 9 is a flow chart illustrating an exemplary method 90 for a computing device to create a webpage having different element orders for different webpage widths. Method 90 can be performed by a computing device such as designer device 72 of FIG. 8 or by any other device or cloud-based service provided by a server or otherwise. Method 90 involves receiving a first input specifying a first layout of elements in a first order for a first webpage width, as shown in block 91, and receiving a second input specifying a second layout of the elements in a second, different order for a second webpage width, as shown in block 92. The first and second layouts can be specified for respective webpage width intervals, e.g., 0-499 pixels and 500 to infinity pixels, etc. The method 90 creates webpage markup code configured to be interpreted by a web browser to create a live DOM specifying the elements of the webpage, as shown in block 93. Please note that this algorithm can be applied to any number of layouts, webpage widths, and/or width ranges.

The method 90 further creates webpage script code configured to be interpreted by the web browser to modify the live DOM based on a current webpage width to display the appropriate first or second layout, as shown in block 94. In one example, the script code is configured to determine the current webpage width when the webpage is initialized in the web browser or when the webpage width changes in the web browser, determine that the current webpage width is the second webpage width (e.g., determining that the current width is within a particular breakpoint interval), and modify the live DOM based on the current webpage width matching the criteria.

In one embodiment of exemplary method 90, the markup code includes a first subtree of nodes specifying the first order of the elements and a second subtree of nodes specifying the second order of the elements. In this embodiment, the script code is configured to cause the web browser to modify the live DOM by changing visibility of the first subtree of nodes to invisible and visibility of the second subtree of nodes to invisible based on the current webpage width being the second webpage width and/or to swap content nodes of the first subset of node with placeholders of the second subset of nodes in the live DOM based on the current webpage width being the second webpage width.

The markup code includes only a single, unduplicated content node for each of the elements in one embodiment of method 90. In one example, the markup code includes content nodes for each of the elements in a first breakpoint interval node for a first breakpoint interval and placeholders for the content nodes in other breakpoint interval nodes so that each of the content nodes appears only once in the markup code.

In one embodiment of exemplary method 90, the markup code has a hyper-text markup language (HTML) format and the script code has a JavaScript format. The computing device additionally or alternatively automatically creates cascading style sheet (CSS) code that further specifies differing appearance attributes of the element for the first webpage width and the second webpage width.

In one embodiment exemplary method 90 also provides preview functionality. In one example this involves receiving input to preview the webpage for a test webpage width and providing a preview of the webpage on the design interface by generating a live DOM based on the markup code, modifying the live DOM based on the test webpage width and the script code, and using the modified live DOM to provide the preview of the webpage on the design interface.

Figure 10:
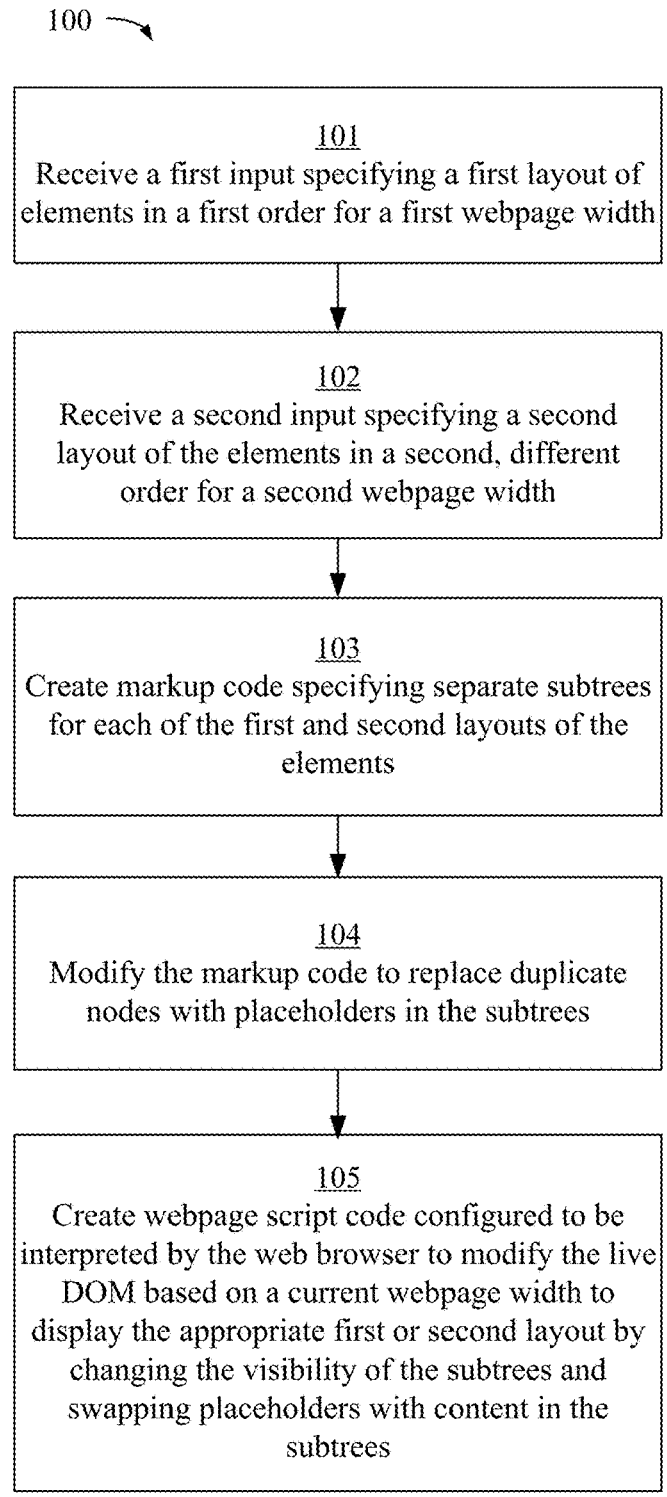
FIG. 10 is a flow chart illustrating an exemplary method for a computing device to create a webpage that has non-duplicative markup code and live DOM altering script code to provide a webpage that provides different layouts for different webpage widths.

FIG. 10 is a flow chart illustrating an exemplary method 100 for a computing device to create a webpage that has non-duplicative markup code and live DOM altering script code to provide a webpage that provides different layouts for different webpage widths. Method 100 can be performed by a computing device such as designer device 72 of FIG. 8 or by any other device or cloud-based service provided by a server or otherwise. Method 100 involves receiving a first input specifying a first layout of elements in a first order for a first webpage width, as shown in block 101, and receiving a second input specifying a second layout of the elements in a second, different order for a second webpage width, as shown in block 102.

The method 100 creates markup code specifying separate subtrees for each of the first and second layouts of the elements, as shown in block 103. In one example, a webpage design tool includes a canvas area upon which a designer has positioned elements in different positions and orders for different webpage widths. The webpage design tool uses these positions and orders of the elements on the canvas to determine a structure for each of the subtrees to be specified by respective portions of the markup code. The order of tags within the markup code is used to define the structure of the subtrees.

The method 100 further involves modifying the markup code to replace duplicate nodes with placeholders in the subtrees, as shown in 104. One exemplary process for modifying the markup code to replace duplicate nodes with placeholders starts with a leaf node in a particular subtree (such as the subtree associated with the largest screen size) and finds that leaf node in other subtrees. If the same leaf node is found on another subtree, the leaf node in the first subtree is considered the shared node and the same leaf node found in the other subtree is replaced with placeholder nodes. Nodes identified as shared nodes are changed to identify their status as shared nodes in one embodiment of the invention. Similarly, nodes identified as placeholder nodes are changed to identify their status as placeholder nodes in one embodiment of the invention. The node replacement process is repeated for all leaf nodes of the tree. The process is then performed for the parents of the leaf nodes (and parent nodes of other parent nodes) replacing parent nodes with placeholders based on determining that sub-trees of the parents are identical, until the duplicate nodes in the tree have been replaced with placeholder nodes.

The method 100 further creates webpage script code configured to be interpreted by the web browser to modify the live DOM based on a current webpage width to display the appropriate first or second layout by changing the visibilities of the subtrees and swapping placeholders for content in the subtrees, as shown in block 105. In one example, the script code is configured to determine the current webpage width when the webpage is initialized in the web browser or when the webpage width changes in the web browser, determine that the current webpage width is the second webpage width (e.g., determining that the current width is within a particular breakpoint interval), and modify the live DOM based on the current webpage width matching the criteria.

Figure 11:
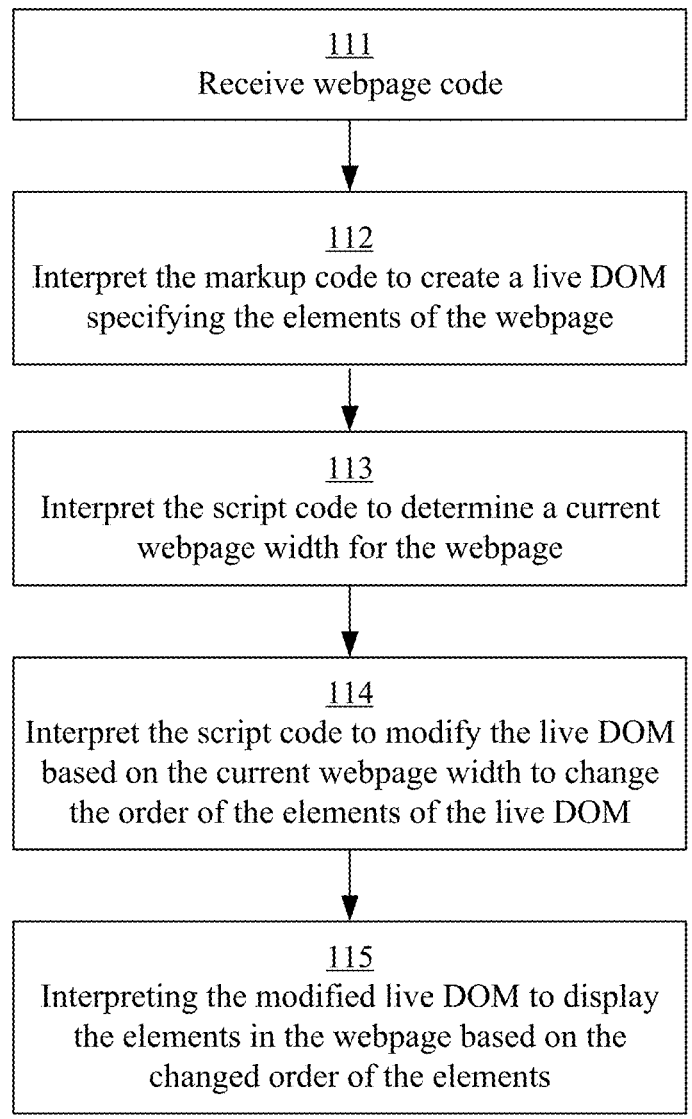
FIG. 11 is a flow chart illustrating an exemplary method for a computing device web browser to display a webpage based on webpage width.

FIG. 11 is a flow chart illustrating an exemplary method 110 for a computing device web browser to display a webpage based on webpage width. Method 110 can be performed by computing devices such as end user devices 82a-n of FIG. 8 or by any other device that provides webpage browsing functions. Method 110 involves receiving webpage code, as shown in block 111, and interpreting markup code of the webpage code to create a live DOM specifying the elements of the webpage, as shown in block 112.

The method 110 further involves interpreting script code of the webpage code to determine a current webpage width for the webpage, as shown in block 113. In one embodiment of method 110, determining the current webpage width involves determining the webpage width when the webpage is initialized in the web browser. In another embodiment of method 110, determining the current webpage width involves detecting a change of webpage width while the webpage is displayed in the web browser.

The method 110 further involves interpreting the script code to modify the live DOM based on the current webpage width to change the order of the element of the live DOM, as shown in block 114. The method 110 then interprets the modified live DOM to display the elements in the webpage based on the changed order of the elements, as shown in block 115. In one embodiment of method 110, the script code is used to modify the live DOM by changing visibility of a first subset of nodes to invisible and visibility of a second subset of nodes to visible based on the current webpage, with the first subset specifying the elements in a first order and the second subset specifying the elements in a second, different order. In another embodiment of method 80, the script code is additionally or alternatively interpreted to swap content sub-nodes of a first subset of nodes with placeholders of a second subset of node in the live DOM based on the current webpage width.

Examples of Altering the Live Hierarchies Used by Web Browsers

Figure 12:
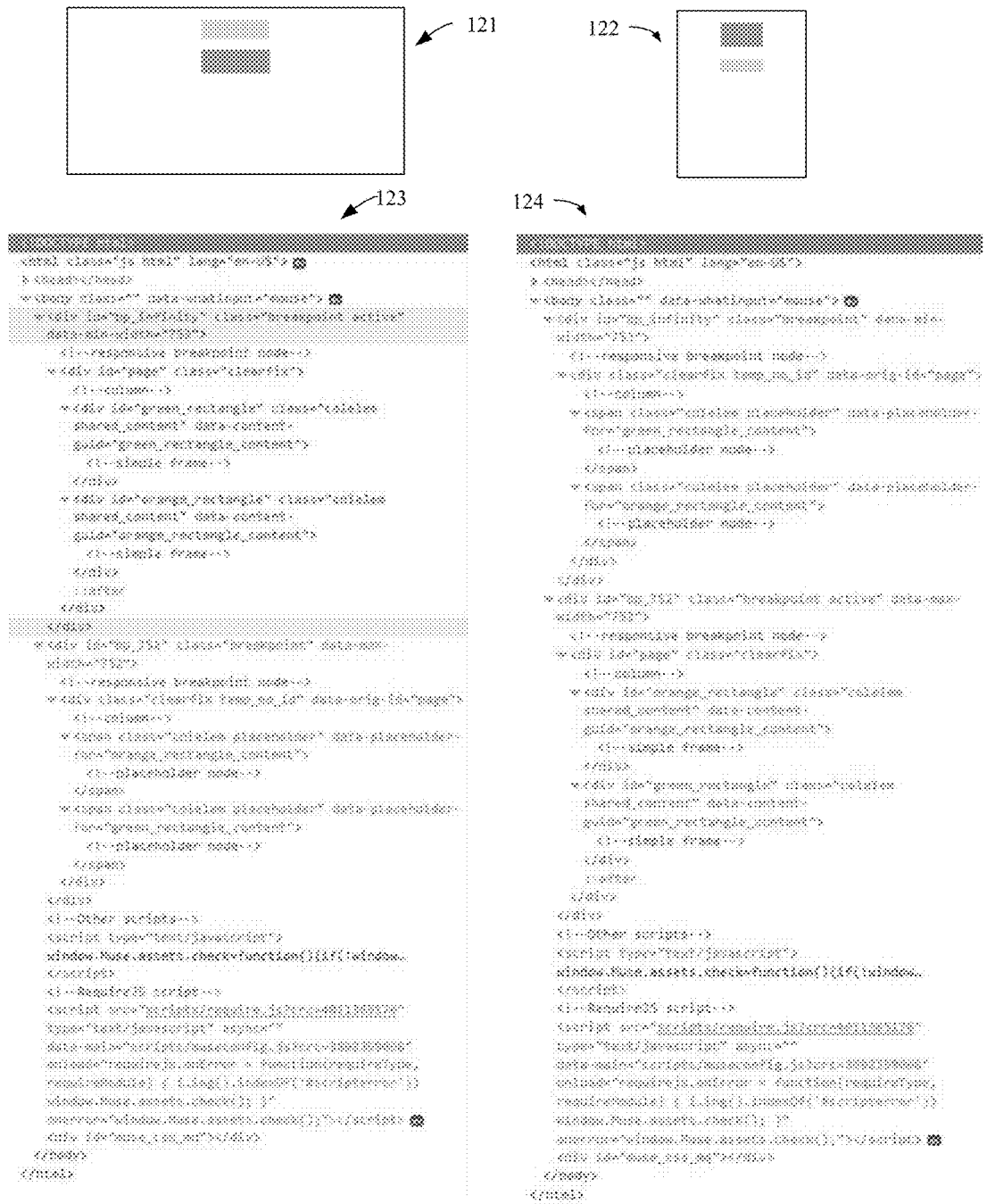
FIG. 12 illustrates how a webpage with alternative layouts for different webpage widths is used by a web browser.

FIG. 12 illustrates how a webpage with alternative layouts for different webpage widths is used by a web browser. Displayed webpage layout 121 is a full screen desktop layout of a webpage rendered by a browser on a desktop computer monitor. While the webpage is being displayed in this way, the web browser inspector shows live hierarchy 123. Displayed webpage layout 122 is a reduced size layout of the webpage in which the current webpage width has been reduced. While the webpage is being displayed in this way, the web browser inspector shows live hierarchy 124. Live hierarchy 123 differs from live hierarchy 124 in several ways. For example, in live hierarchy 123, the breakpoint node bp_infinity has class "breakpoint active" and the breakpoint node bp_752 has class "breakpoint." In contrast, in live hierarchy 124, these classes are classes switched for the breakpoint nodes. In this example, switching the classes of the breakpoint nodes changes which of the breakpoints is visible and which is invisible. In addition, content nodes are swapped with placeholder nodes.

Figure 13:
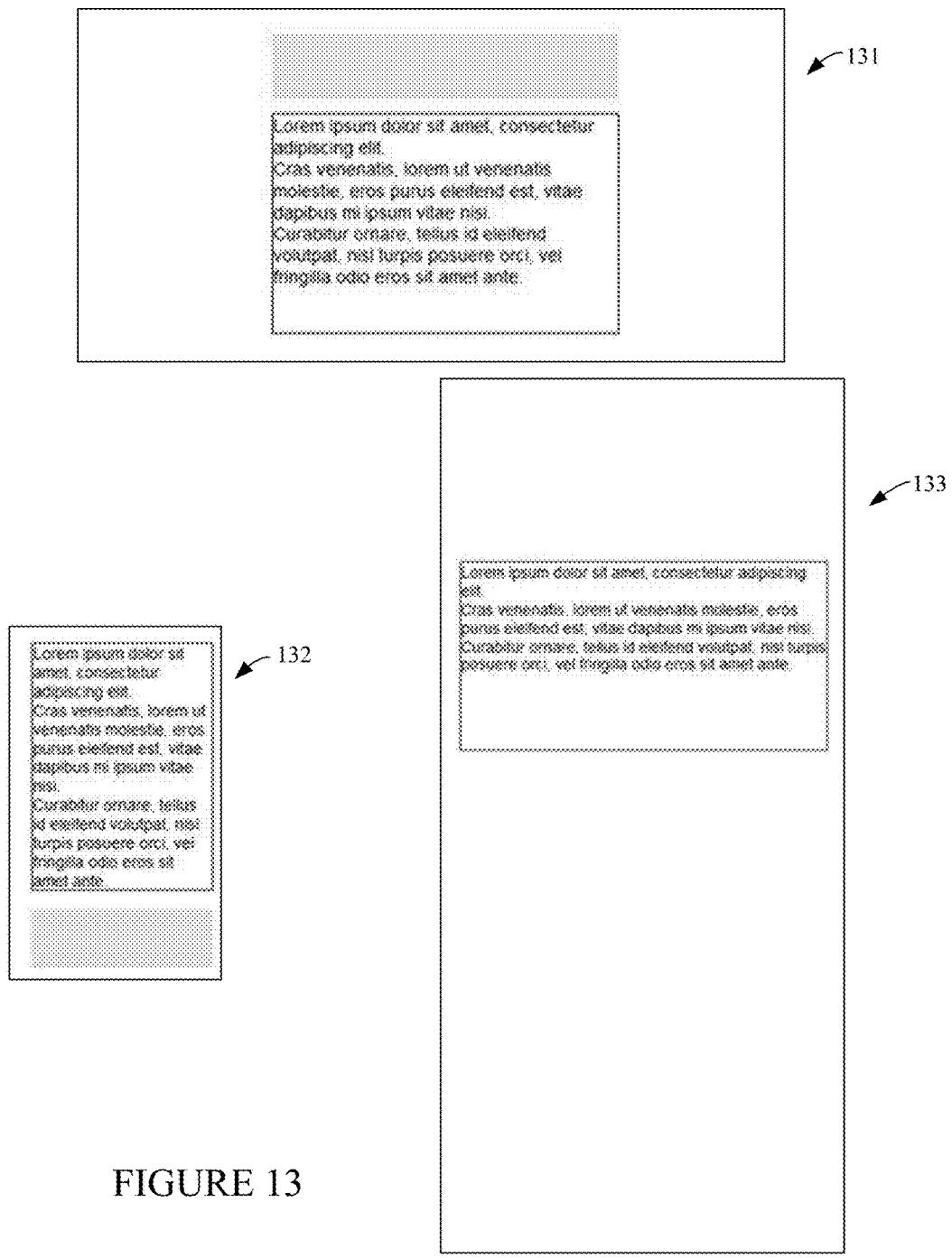
FIG. 13 illustrates how a webpage with alternative layouts, positions, and attributes for different webpage widths is used by a web browser.
Figure 14:
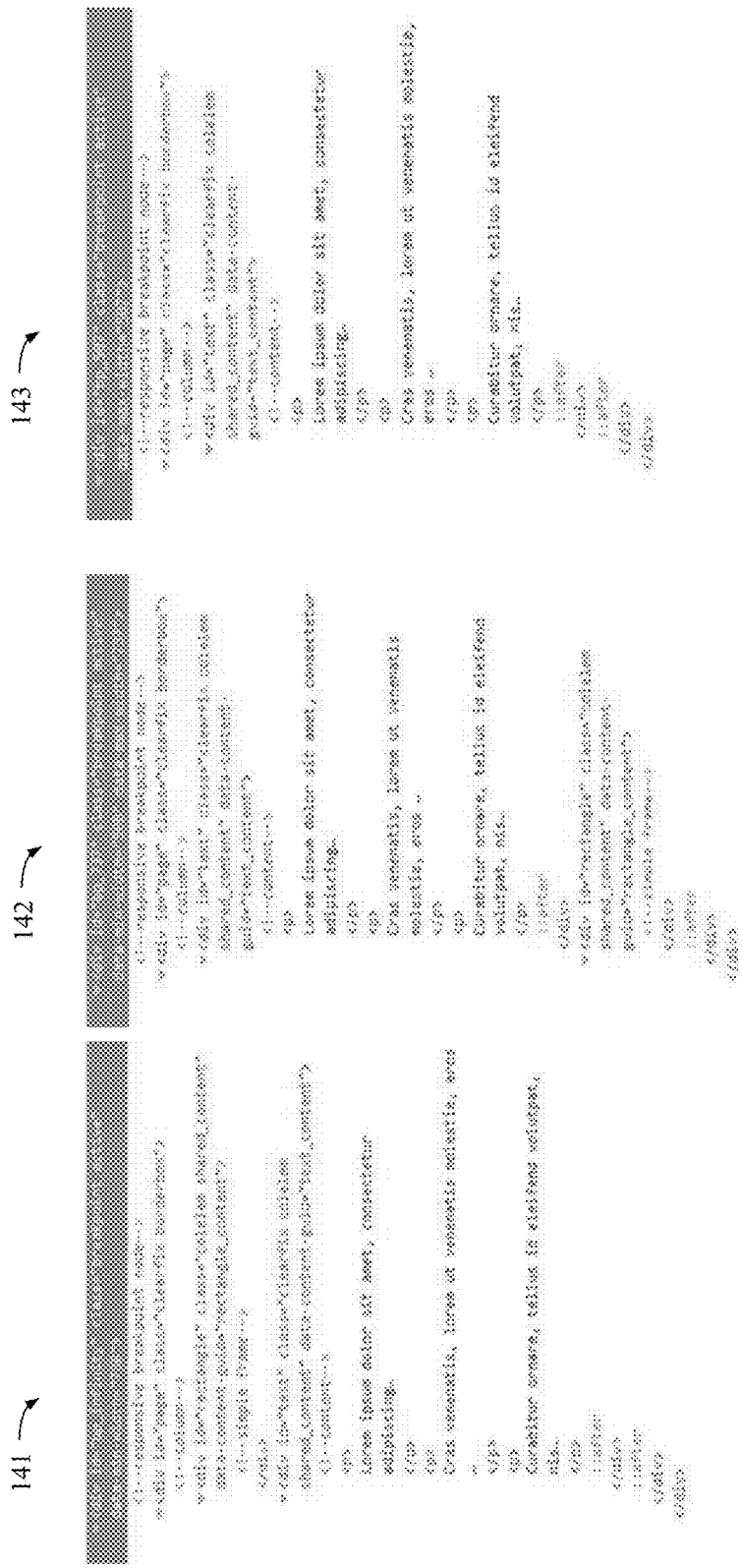
FIG. 14 illustrates the web browser live hierarchies of the active breakpoint nodes for the webpage layouts of FIG. 10.

FIG. 13 illustrates how a webpage with alternative layouts, positions, and attributes for different webpage widths is used by a web browser. FIG. 14 illustrates the web browser live hierarchies of the active breakpoint nodes for the webpage layouts of FIG. 13. The changes to the live hierarchies are achieved by using the webpage's script code to modify the live hierarchies based on the current webpage width. In FIG. 13, displayed webpage layout 131 is a full screen desktop layout of a webpage rendered by a browser on a desktop computer monitor. While the webpage is being displayed in this way, the web browser inspector shows live hierarchy 141 of breakpoint bp_infinity (FIG. 14). Displayed webpage layout 132 is a reduced size layout of the webpage in which the current webpage width has been reduced. While the webpage is being displayed in this way, the web browser inspector shows live hierarchy 142 of breakpoint bp_737. Displayed webpage layout 133 is a further reduced size layout of the webpage in which the current webpage width has been further reduced. While the webpage is being displayed in this way, the web browser inspector shows live hierarchy 143 of breakpoint bp_507. FIGS. 13 and 14 illustrate how the webpage is altered and otherwise used to order, position, and display webpage elements for alternative webpage layouts. Moreover, the green rectangle is not included in the smallest breakpoint layout illustrating that not all elements need be visible in every layout. The ability to easily exclude elements facilitates to use of elements, such as accordion selection tools, in only one or a few layouts for certain webpage widths.

Exemplary Computing Environment

Figure 15:
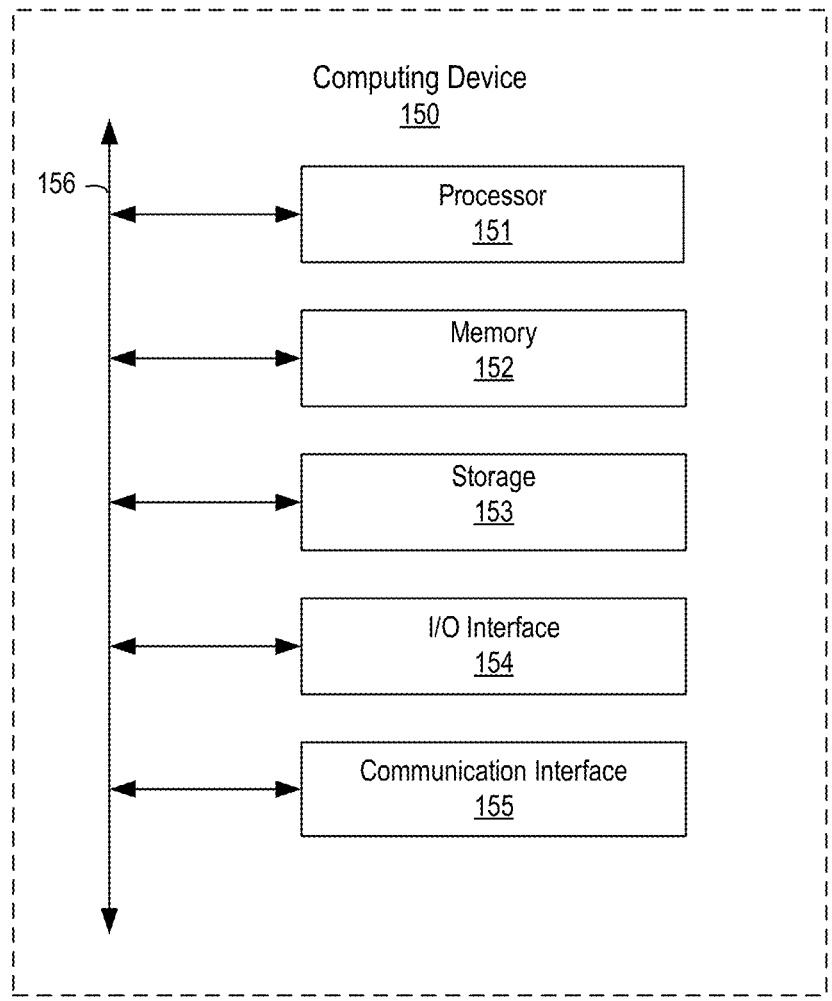
FIG. 15 is a block diagram depicting an example hardware implementation.

Any suitable computing system or group of computing systems can be used to implement the techniques and methods disclosed herein. For example, FIG. 15 is a block diagram depicting examples of implementations of such components. The computing device 150 can include a processor 151 that is communicatively coupled to a memory 152 and that executes computer-executable program code and/or accesses information stored in memory 152 or storage 153. The processor 151 may comprise a microprocessor, an application-specific integrated circuit ("ASIC"), a state machine, or other processing device. The processor 151 can include one processing device or more than one processing device. Such a processor can include or may be in communication with a computer-readable medium storing instructions that, when executed by the processor 151, cause the processor to perform the operations described herein.

The memory 152 and storage 153 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 150 may also comprise a number of external or internal devices such as input or output devices. For example, the computing device is shown with an input/output ("I/O") interface 154 that can receive input from input devices or provide output to output devices. A communication interface 155 may also be included in the computing device 150 and can include any device or group of devices suitable for establishing a wired or wireless data connection to one or more data networks. Non-limiting examples of the communication interface 155 include an Ethernet network adapter, a modem, and/or the like. The computing device 150 can transmit messages as electronic or optical signals via the communication interface 155. A bus 156 can also be included to communicatively couple one or more components of the computing device 150.

The computing device 150 can execute program code that configures the processor 121 to perform one or more of the operations described above. The program code can include one or more modules. The program code may be resident in the memory 152, storage 153, or any suitable computer-readable medium and may be executed by the processor 151 or any other suitable processor. In some embodiments, modules can be resident in the memory 152. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for a computing device to create a webpage having different element orders for different webpage widths, the method comprising:
   receiving, by a computing device, a first input specifying a first layout of elements for a first webpage width, the first input positioning the elements in a first order on a design canvas of a design interface;
   receiving, by the computing device, a second input specifying a second layout of the elements for a second webpage width, the second input positioning the elements in a second order on the design canvas, the first webpage width different from the second webpage width and the first order different from the second order;
   creating, by the computing device, markup code for the webpage that specifies a first subtree of nodes specifying the first order of the elements for the first layout and a second subtree of nodes specifying the second order of the elements for the second layout;
   modifying, by the computing device, the markup code to replace duplicate nodes with placeholders in the second subtree of nodes;
   implementing, by the computing device, a script code to modify a live DOM created from the markup code, to specify positioning the elements in the second order when the current webpage width is the second webpage width; and
   modifying the live DOM by swapping content nodes of the first subtree with the placeholders of the second subtree, based on the current webpage width being the second webpage width.

2. The method of claim 1, wherein modifying the markup code to replace duplicate nodes with placeholders in the subtrees comprises:
- identifying a leaf node in a first subtree corresponding to the first layout; and
- based on determining that the leaf node is in the second subtree corresponding to the second layout, replacing the leaf node in the second subtree with a placeholder pointing to the leaf node in the first subtree.

3. The method of claim 1, wherein modifying the markup code to replace duplicate nodes with placeholders in the subtrees further comprises:
- identifying a parent node in the first subtree;
- based on determining that the parent node is in the second subtree and that the nodes under the parent node of the first subtree are the same as the nodes under the parent node of the second tree, replacing the parent node in the second subtree with a placeholder pointing to the parent node in the first subtree.

4. The method of claim 3 further comprising identifying and replacing duplicate leaf and parent nodes until all duplicate nodes in the subtrees are replaced with placeholders.

5. The method of claim 1, wherein the first layout is specified for a first breakpoint interval comprising a first range of webpage widths and the second layout is specified for a second breakpoint interval comprising a second, different range of webpage widths, wherein the markup code comprises:
- a content node for each of the elements in a first breakpoint interval node for the first breakpoint interval; and
- placeholders for the content nodes in other breakpoint interval nodes, wherein each of the content nodes appears only once in the markup code.

6. The method of claim 1, wherein the markup code has a hyper-text markup language (HTML) format and the script code has a JavaScript format.

7. The method of claim 1 further comprising the computing device automatically creates cascading style sheet (CSS) code that further specifies differing appearance attributes of the elements for the first webpage width and the second webpage width.

8. The method of claim 1 further comprising the computing device:
- receiving input to preview the webpage for a test webpage width; and
- providing a preview of the webpage on the design interface by generating a live DOM based on the markup code, modifying the live DOM based on the test webpage width and the script code, and using the modified live DOM to provide the preview of the webpage on the design interface.

9. The method of claim 1, wherein the markup code comprises a first subtree of nodes specifying the first order of the elements and a second subtree of nodes specifying the second order of the elements, wherein the script code is configured to cause the web browser to modify the live DOM by changing visibility of the first subtree to invisible and visibility of the second subtree to visible based on the current webpage width being the second webpage width.

10. The method of claim 1, wherein the script code is configured to cause the web browser to:
- determine the current webpage width when the webpage is initialized in the web browser or when the webpage width changes in the web browser;
- determine that the current webpage width is the second webpage width; and
- modify the live DOM based on the current webpage width being the second webpage width.

11. The method of claim 1, wherein the first layout is specified for a first breakpoint interval comprising a first range of webpage widths and the second layout is specified for a second breakpoint interval comprising a second, disjunct range of webpage widths, wherein the script code is configured to cause the web browser to:
- determine the current webpage width when the webpage is initialized in the web browser or when the webpage width changes width in the web browser;
- determine that the current webpage width is within the second breakpoint interval; and
- modify the live DOM based on the current webpage width being within the second breakpoint interval.

12. The method of claim 1, wherein the computing device receives input specifying n layouts of the elements for n webpage width ranges, wherein the script code is configured to be interpreted by the web browser to modify the live DOM based on the current webpage width, the web browser interpreting the live DOM to position the elements in one of the n layouts based on which of the n webpage width ranges the current webpage width is within.

13. A method for a computing device web browser to display a webpage based on webpage width, the method comprising the computing device web browser:
- receiving webpage code, the webpage code comprising markup code and script code, the markup code specifying the elements of the webpage using a hierarchical structure;
- interpreting the markup code to create a live document object model (DOM) specifying the elements of the webpage;
- interpreting the script code to determine a current webpage width for the webpage;
- interpreting the script code to modify the live DOM based on the current webpage width;
- modifying the live DOM including swapping content nodes of a first subtree of nodes with placeholders of a second subtree of nodes in the live DOM based on the current webpage width, wherein the first subtree specifies the elements in a first order and the second subtree specifies the elements in a second, different order; and
- interpreting the modified live DOM to display the elements in the webpage based on the changed order of the elements.

14. The method of claim 13 wherein determining the current webpage width comprises determining the webpage width when the webpage is initialized in the web browser.

15. The method of claim 13 wherein determining the current webpage width comprises detecting a change of webpage width while the webpage is displayed in the web browser.

16. The method of claim 13, wherein interpreting the script code to modify the live DOM comprises swapping content nodes of a first subtree of nodes with placeholders of a second subtree nodes in the live DOM based on the current webpage width, wherein the first subtree specifies the elements in a first order and the second subtree specifies the elements in a second, different order.

17. The method of claim 13, wherein the markup code comprising a first breakpoint interval node specifying a first order of the elements and a second breakpoint interval node specifying a second, different order of the elements, wherein the computing device web browser:
- determines that the current webpage width is within the second breakpoint interval; and based on the current webpage width being within the second breakpoint interval:
  sets visibility of the first breakpoint interval subtree of nodes to invisible;
  sets visibility of the second breakpoint interval subtree of nodes to visible; and
    swaps placeholders of the second breakpoint interval subtree of nodes with content nodes of the first breakpoint interval subtree of nodes.

18. A system comprising:
a processor; and
a non-transitory computer readable medium comprising instructions, wherein, when the instructions are executed by the processor, the processor preforms operations comprising:
receiving a first input specifying a first layout of elements for a first webpage width, the first input positioning the elements in a first order on a design canvas of a design interface;
receiving a second input specifying a second layout of the elements for a second webpage width, the second input positioning the elements in a second order on the design canvas, the first webpage width different from the second webpage width and the first order different from the second order;
creating markup code for the webpage that specifies a first subtree of nodes specifying the first order of the elements for the first layout and a second subtree of nodes specifying the second order of the elements for the second layout;
modifying the markup code to replace duplicate nodes with placeholders in the second subtree of nodes;
implementing a script code to modify a live DOM created from the markup code, to specify positioning the elements in the second order when the current webpage width is the second webpage width; and
modifying the live DOM by swapping content nodes of the first subtree with the placeholders of the second subtree, based on the current webpage width being the second webpage width to thereby change the first subtree from visible to invisible, and the second subtree from invisible to visible.

* * * * *